Figure 2:
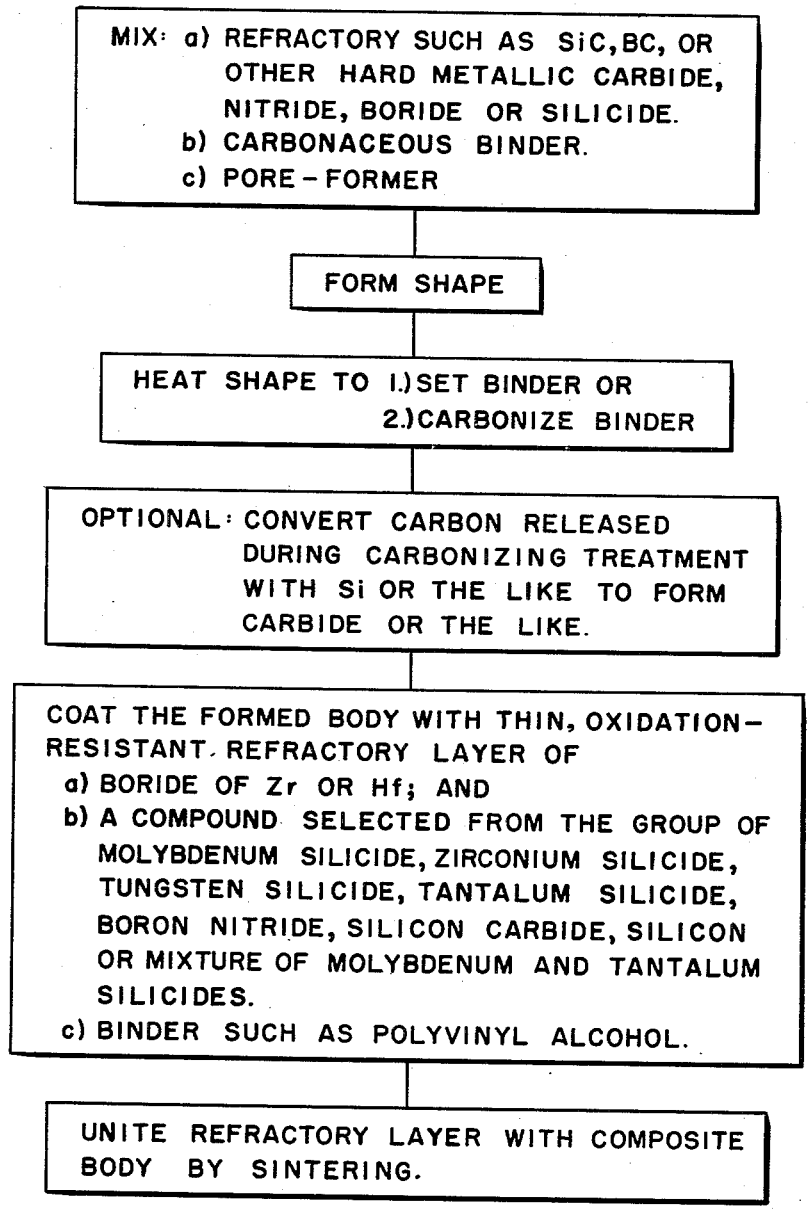

June 15, 1965  P. T. B. SHAFFER  3,189,477
OXIDATION-RESISTANT CERAMICS AND METHODS OF
MANUFACTURING THE SAME
Filed April 13, 1960  2 Sheets-Sheet 1

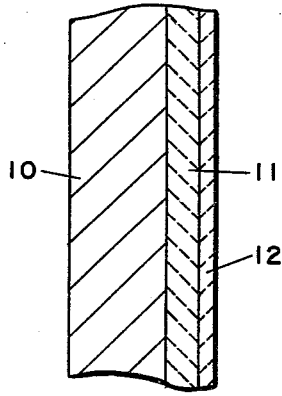

*Fig. 1*

10 STEEL FRAME MEMBER.
11 POROUS REFRACTORY SUCH AS METALLIC CARBIDE, NITRIDE, BORIDE, OR SILICIDE.
12 OXIDATION-RESISTANT REFRACTORY COATING OF ZIRCONIUM BORIDE OR HAFNIUM BORIDE PLUS A SILICIDE OF MOLYBDENUM, ZIRCONIUM, TUNGSTEN, TANTALUM, BORON NITRIDE, SILICON CARBIDE, SILICON OR MIXTURES OF MOLYBDENUM AND TANTALUM SILICIDES.

*INVENTOR.*
PETER T.B. SHAFFER
BY
*K.W.S. Brunell*
ATTORNEY

United States Patent Office 3,189,477
Patented June 15, 1965

3,189,477
OXIDATION-RESISTANT CERAMICS AND METHODS OF MANUFACTURING THE SAME
Peter T. B. Shaffer, Niagara Falls, N.Y., assignor to The Carborundum Company, Niagara Falls, N.Y., a corporation of Delaware
Filed Apr. 13, 1960, Ser. No. 21,896
14 Claims. (Cl. 117—46)

The present invention relates to oxidation-resistant ceramics and the manufacture thereof and, more particularly, to refractory bodies or articles which, in use, possess a relatively high degree of oxidation resistance. Although not limited thereto, my invention is especially useful in respect to those refractory bodies or articles which must possess oxidation resistance and, at the same time, must possess low overall density so as to be useable where light weight is a requisite.

It has been found that many of the refractory materials, such as silicon carbide, boron carbide, or any of the hard metallic carbides, nitrides, borides or silicides or materials capable of reacting during treatment to form a hard metallic carbide, nitride, boride or silicide, may be formed into cellular or porous refractory bodies, thereby providing refractory bodies which are light in weight and usable in many types of structures, including those where insulation is required. In general, such cellular ceramic bodies lack oxidation resistance and are permeable to gases, thus markedly reducing their insulating properties. Such materials, on the other hand, can be hot pressed or sintered into bodies which possess certain desirable features, including impermeability to gases, and suitable refractoriness, but such articles are of high density and cannot be used for many types of installations where weight is an important factor. While the present invention may be utilized with such hard, dense, hot pressed or sintered bodies and additional properties imparted thereto, my invention is especially useful in connection with the cellular or expanded type of refractory product mentioned above.

I have found that, by the addition of an oxidation-resistant refractory coating to a cellular refractory article, a composite body is obtained which possesses highly desirable properties including low overall density, high refractoriness, good thermal insulating properties, non-permeability to gases, thermal shock resistance and oxidation resistance. A composite body having properties such as those mentioned can be obtained in accordance with my invention by providing a relatively thin layer or coating of an oxidation-resistant compound on one or more surfaces of a cellular ceramic body, the coating or layer becoming an integral part of the refractory body or article. The entire article can be coated with the impervious oxidation-resistant layer, although for many purposes, it may not be necessary to coat the entire article. In such instances, the surface or surfaces which will be exposed to the oxidizing influences will be coated.

In carrying out my invention, the ceramic refractory body is first formed to the desired shape. The refractory oxidation-resistant coating is then applied by suitable means to one or more of the surfaces of the preformed body and it is then rendered an integral part of the composite body by sintering or by other suitable means.

While, as stated above, my invention is not limited to the formation of composite bodies in which the main body portion is cellular in character, my invention is especially useful in the manufacture of such bodies and it will be described herein as applied thereto.

Reference is made to the drawings, which are illustrative of the present invention, and in which—

FIGURE 1 is a fragmentary sectional view, highly enlarged, showing a portion of a steel frame 10 supporting a ceramic body 11 which is protected by an impervious, oxidation-resistant refractory coating 12 in accordance with the present invention; and FIGURE 2 is a flow sheet depicting the various steps of the process of the present invention.

In the manufacture of such porous or cellular bodies, finely divided particles of a refractory material, such as silicon carbide, boron carbide or any of the hard metallic carbides, nitrides, borides or silicides, or materials capable of reacting during the process to form a hard metallic carbide, nitride, boride or silicide, are mixed with a carbonaceous binder, such as a synthetic resin or a compound of resins, and a pore-forming material. The pore-forming material may be small resinous spheres or a foaming agent or skeletal graphite or the like. The mixture thus made is formed to a suitable shape and then heated. The heating may be carried only to the point of setting the binder, but it may be carried to the point of carbonizing the binder and/or the pore-forming material. Also, if desired, the carbon released during the carbonizing treatment, may be combined with silicon or other materials or metals to form carbides or the like in the finished bodies.

In one method of manufacturing such lightweight refractory bodies, the particulate refractory material, hollow spheres, the density of the refractory materials may be adsynthetic resin are first mixed together. The mixture is then cast to the desired shape and the binder set. If the article is to be used for an intermediate temperature range, the organic resinous binder and other carbonizable material, such as the thermosetting resin spheres, are carbonized to provide a porous carbon network or matrix that forms a binder that is satisfactory for many minimum strength requirements. For high temperature work, the carbon binder can be siliconized to provide a silicon carbide bond having high strength and good refractory properties.

A low density silicon carbide refractory material can be prepared from finely divided silicon carbide, phenolic spheres, and polyvinyl alcohol. The mix is first made and molded to a suitable shape. Upon firing, the polyvinyl alcohol or other binder is burned off, leaving a network of carbon. By regulating the proportion of phenolic spheres, the density of the refractory materials may be adjusted over a relatively wide range. A body of this character has a unique combination of properties, including high strength, good thermal insulating properties, thermal shock resistance, refractoriness, chemical inertness and, of course, light weight.

Instead of using spheres of a thermosetting resin to form the pores in the formed body, foaming agents can be used. For example, finely divided silicon carbide can be mixed with a foaming agent and a carbonizable thermosetting resin and the mixture poured into a mold and heated to cure the resin. Curing conditions can be regulated according to the desired pore size, the foaming agent selected, and the resin. The cured body then may be carbonized and preferably siliconized by a vapor solid reaction using vaporized silicon at a temperature of 2100° C. to 2300° C. The resulting refractory body has low density and the other properties mentioned above.

The formation of such porous or cellular refractory bodies does not form any part of the present invention but has been described herein for the sake of completeness.

As indicated, articles of this character lack oxidation resistance and are permeable to gases and, as a consequence, their insulating proporties are relatively low. I have found that, by the addition of an integral oxidation-resistant refractory coating, the several desirable properties mentioned above may be obtained.

In carrying out my invention, the formed body is coated with a relatively thin oxidation-resistant refractory layer and this layer is made an integral part of the composite body.

The coating, when applied to the body, consists essentially of a boride of a metal selected from the group of zirconium and hafnium, a compound of the group consisting of molybdenum silicide, zirconium silicide, tungsten silicide, tantalum silicide, boron nitride, silicon carbide, silicon metal, or a mixture of molybdenum and tantalum silicides, and a binder material such as polyvinyl alcohol or any of a large number of carbonaceous binders. After the coating mixture is prepared, it is then applied to the cellular or other refractory article, or to one or more surfaces thereof, by arc-spraying, flame-spraying or by any other suitable means of physically applying the coating mixture to the surface of the article. Either during the application of the coating or subsequently thereto, it is heated to a suitable sintering temperature.

*Example*

By way of specific example, a slurry of 90 mole percent zirconium boride, 10 mole percent molybdenum silicide, and 2 percent polyvinyl alcohol was made. Enough water was added to make the slurry of a workable consistency. The coating was then applied to a cellular ceramic and it was dried overnight in an oven. It was then fired at 2150° C. for one hour to sinter it. The articles thus made were tested by placing them on edge in a furnace at 1950° C. in a moving air atmosphere for 15 minutes. There was no evidence whatsoever of disintegration, cracking or spalling. In this instance, the product had low overall density in the neighborhood of about .6 gm./cc. The product thus made possessed high refractoriness, high thermal insulation, nonpermeability, oxidation resistance, and thermal shock resistance. Some such products were subjected to the action of an acetylene torch at 3000° C. Other articles were tested by dropping samples into a furnace at 2000° C. No fractures occurred when the articles were subjected to such tests.

As indicated above, a preferred coating comprises a major proportion of zirconium boride, a minor proportion of molybdenum silicide, and a suitable binder. Hafnium boride may be utilized instead of the zirconium boride. Other materials which may be used in minor proportions instead of the molybdenum silicide are zirconium silicide, tungsten silicide, tantalum silicide, boron nitride, silicon carbide, silicon metal, or a mixture of molybdenum and tantalum silicide.

The zirconium boride or hafnium boride should be present in an amount of from 50 to 95 mole percent and the molybdenum silicide or other compound to be mixed with the zirconium or hafnium boride should be present in the amount of from 5 to 50 mole percent. However, in the case of some such compounds approximately 1 mole percent may be sufficient.

As indicated above, I have found that satisfactory results are obtained when about 2 percent of the mixture by weight consists of the polyvinyl alcohol binder. The amount of binder present should be kept as small as possible consistent with satisfactory coating operations. Other binders which are entirely suitable are Carbowax 4000, corn syrup, casein, gum Agar, and many other carbonaceous polymers.

As indicated above, the coating may be applied by arc-spraying. In using this method, the powdered mixture is dropped into a stream of gas which is passed through an arc which fuses the powder and splatters it against the sample or article being coated. Flame-spraying also may be employed. In this method, the powdered mixture is dropped into a stream of combustible gases playing upon the article to be coated.

Suitable sintering temperatures will be employed in any case in order to form the composite article and the specific temperatures to be employed will depend upon the particular mixture being used. I have found that satisfactory results are obtained if the composite article is maintained at a temperature of approximately 2100° C. for a period of one to two hours or for a few minutes at a temperature of approximately 2250° C.

The thickness of the coating to be applied will depend to some extent upon the service to which the composite article is to be put. I have found that a thickness of 10 to 20 thousandths of an inch gives highly desirable results from the standpoint of impermeability and oxidation resistance.

As is well known, zirconium boride alone does not have satisfactory oxidation resistance. Therefore, the material to be mixed with the zirconium boride in forming the articles of this invention should have high oxidation resistance; and, while I have specified herein certain materials which can be used, it will be understood that there may be others which will perform in an equivalent manner. In any event, the material to be mixed with the zirconium boride must be of such nature as to oxidize to a glassy form and have high oxidation resistance.

As an example of the oxidation resistance of articles made in accordance with my invention, I have found that articles made in accordance with the specific example set forth above have a rate of oxidation of 1 mg./sq. cm./hr. at 1400° C., 8 to 10 mgs./sq. cm./hr. at 1675° C., and 40 to 50 mgs./sq. cm./hr. at 1950° C.

As will be apparent to those skilled in the art, articles made in accordance with my invention may be used for many purposes, including insulation for manned or unmanned high speed air vehicles, electronics packages requiring short-term insulation against high temperatures, insulation for backing frames made of steel, and insulation for rocket motors where insulation from the frame is desired.

While I have set forth herein specific examples of articles embodying my invention and have described several ways in which such articles may be made, it will be understood that my invention may be otherwise embodied or utilized within the scope of the appended claims.

I claim:

1. A composite, oxidation-resistant refractory article comprising a refractory body portion and a sintered coating of an oxidation-resistant refractory material on at least one external surface thereof, said coating being formed from a mixture consisting essentially of at least 50 mole percent of a boride of a metal selected from the group consisting of zirconium and hafnium and up to 50 mole percent of a compound selected from the group consisting of molybdenum silicide, zirconium silicide, tungsten silicide, tantalum silicide, silicon carbide, silicon, boron nitride and a mixture of molybdenum and tantalum silicides, said coating being substantially impervious to gases.

2. The article as defined in claim 1 in which said coating is formed from a mixture consisting essentially of from 50 to 95 mole percent of a boride of a metal selected from the group consisting of zirconium and hafnium and from 5 to 50 mole percent of molybdenum silicide.

3. The article as defined in claim 1 in which said coating is formed from a mixture consisting essentially of from 50 to 95 mole percent of a boride of a metal selected from the group consisting of zirconium and hafnium and from 5 to 50 mole percent of zirconium silicide.

4. The article as defined in claim 1 in which said coating is formed from a mixture consisting essentially of from 50 to 95 mole percent of a boride of a metal selected from the group consisting of zirconium and hafnium and from 5 to 50 mole percent of silicon carbide.

5. The article as defined in claim 1 in which said coating is formed from a mixture consisting essentially of from 50 to 95 mole percent of a boride of a metal selected from the group consisting of zirconium and hafnium and from 5 to 50 mole percent of powdered silicon metal.

6. The article as defined in claim 1 in which said coating is formed from a mixture consisting essentially of from 50 to 95 mole percent of a boride of a metal selected from the group consisting of zirconium and hafnium and from 5 to 50 mole percent of boron nitride.

7. The article as defined in claim 1 in which said coating is formed from a mixture consisting essentially of from 50 to 95 mole percent of a boride of a metal selected from the group consisting of zirconium and hafnium and from 5 to 50 mole percent of tungsten silicide.

8. The article as defined in claim 1 in which said coating is formed from a mixture consisting essentially of from 50 to 95 mole percent of a boride of a metal selected from the group consisting of zirconium and hafnium and from 5 to 50 mole percent of tantalum silicide.

9. The article as defined in claim 1 in which said coating is formed from a mixture consisting essentially of from 50 to 95 mole percent of a boride of a metal selected from the group consisting of zirconium and hafnium and from 5 to 50 mole percent of a mixture of molybdenum and tantalum silicides.

10. A composite, oxidation-resistant refractory body consisting essentially of a sintered coating of an oxidation-resistant refractory material on at least one external surface of a cellular refractory body, said coating being formed from a mixture consisting essentially of from 50 to 95 mole percent of a boride of a metal selected from the group consisting of zirconium and hafnium and from 5 to 50 mole percent of a compound selected from the group consisting of molybdenum silicide, zirconium silicide, tungsten silicide, tantalum silicide, silicon carbide, silicon, boron nitride and a mixture of molybdenum and tantalum silicides.

11. A method of making a composite, oxidation-resistant refractory article comprising the steps of coating at least one external surface of a refractory body with a mixture consisting essentially of from 50 to 95 mole percent of a boride of a metal selected from the group consisting essentially of zirconium and hafnium, from 5 to 50 mole percent of a compound selected from the group consisting essentially of molybdenum silicide, zirconium silicide, tungsten silicide, tantalum silicide, silicon carbide, slicon, boron nitride and a mixture of molybdenum and tantalum silicide, and a carbonaceous binder, and sintering said coating to form an integral bonding of the coating to said body.

12. The method as defined in claim 11 in which said mixture consists essentially of from 50 to 95 mole percent of zirconium boride, from 5 to 50 mole percent of molybdenum silicide and a carbonaceous binder.

13. The method as defined in claim 11 in which the coated body is sintered at a temperature in the range of from about 2100° C. to about 2250° C.

14. The method as defined in claim 11 in which the refractory body to be coated is a cellular refractory body.

References Cited by the Examiner
UNITED STATES PATENTS

| | | | |
|---|---|---|---|
| 2,546,142 | 3/51 | Watson | 117—221 X |
| 2,749,254 | 6/56 | Slyh et al. | 117—46 |
| 2,766,141 | 10/56 | Nicholson | 117—123 |
| 2,822,302 | 2/58 | McCaughna | 117—221 |
| 2,872,327 | 2/59 | Taylor | 106—57 X |
| 2,943,951 | 7/60 | Haglund | 117—46 X |
| 3,025,182 | 3/62 | Schrewelins | 117—105 |

RICHARD D. NEVIUS, *Primary Examiner.*